United States Patent
Hua et al.

(10) Patent No.: US 10,642,417 B2
(45) Date of Patent: May 5, 2020

(54) METHOD AND APPARATUS FOR DETERMINING TOUCHING ACTION AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Lei Hua, Beijing (CN); Qing Yang, Beijing (CN); Hongchao He, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 183 days.

(21) Appl. No.: 15/227,435

(22) Filed: Aug. 3, 2016

(65) Prior Publication Data
US 2017/0262128 A1    Sep. 14, 2017

(30) Foreign Application Priority Data
Mar. 10, 2016    (CN) .......................... 2016 1 0139413

(51) Int. Cl.
G06F 3/041    (2006.01)
G06F 3/044    (2006.01)

(52) U.S. Cl.
CPC ............ *G06F 3/0418* (2013.01); *G06F 3/044* (2013.01)

(58) Field of Classification Search
CPC ................................ G06F 3/044; G06F 3/0418
See application file for complete search history.

(56) References Cited

U.S. PATENT DOCUMENTS

2010/0252336 A1* 10/2010 Lu .................. G06F 3/0418
                                                            178/18.06
2012/0249442 A1* 10/2012 Chang ............ G06F 3/0416
                                                                  345/173
(Continued)

FOREIGN PATENT DOCUMENTS

CN    102419652 A    4/2012
CN    103294299 A    9/2013
(Continued)

OTHER PUBLICATIONS

First Chinese Office Action, for Chinese Patent Application No. 201610139413.7, dated Feb. 26, 2018, 16 pages.

*Primary Examiner* — Amare Mengistu
*Assistant Examiner* — Jennifer L Zubajlo
(74) *Attorney, Agent, or Firm* — Kinney & Lange, P.A.

(57) ABSTRACT

The present disclosure provides a method and apparatus for determining touching action and a display device. The method comprises the following steps of: determining a first touching region where a variation value of capacitance is larger than or equal to a first preset value during each period of N consecutive periods, in which N≥2; and outputting a touching signal according to the first touching region, wherein each period of the N consecutive periods is a scanning period of the touch pane. The embodiment of the present disclosure may scan all of the touching regions of the touch panel during N consecutive scanning periods, and then determine the first touching region has a variation value of capacitance larger than or equal to the first preset value during the N consecutive scanning periods to be a region touched by the user so as to output a touch signal based on the region. Since it can't determine a touching region has a variation value of capacitance larger than or equal to a preset value only during a few scanning periods, the accuracy for (Continued)

determining a first touching region where a variation value of capacitance is larger than or equal to a first preset value during each period of N consecutive periods, , in which N≥2 — S1 outputting a touching signal according to the first touching region — S2 determining the touching event may be enhanced so as to avoid false trigger of the touching event of a touch panel by external noises.

7 Claims, 5 Drawing Sheets

(56) References Cited

U.S. PATENT DOCUMENTS

| | | | | |
|---|---|---|---|---|
| 2013/0076700 A1* | 3/2013 | Chiu | ............... | G06F 3/044 |
| | | | | 345/179 |
| 2015/0103043 A1* | 4/2015 | Hills | ............... | G06F 3/044 |
| | | | | 345/174 |
| 2015/0109243 A1* | 4/2015 | Jun | ............... | G06F 3/044 |
| | | | | 345/174 |
| 2015/0227257 A1* | 8/2015 | Lee | ............... | G06F 3/0418 |
| | | | | 345/174 |
| 2016/0070388 A1* | 3/2016 | Yoshikawa | ......... | G06F 3/0418 |
| | | | | 345/174 |

FOREIGN PATENT DOCUMENTS

| | | | |
|---|---|---|---|
| CN | 104020916 A | * | 9/2014 |
| CN | 104020916 A | | 9/2014 |
| CN | 104049794 A | | 9/2014 |

\* cited by examiner

| B<br>A | 1 | 2 | 3 | 4 | 5 | 6 |
|---|---|---|---|---|---|---|
| 1 | 1067 | 1036 | 1086 | 1054 | 1017 | 1038 |
| 2 | 1000 | 1011 | 1049 | 1024 | 1051 | 1036 |
| 3 | 1047 | 1043 | 1062 | 1002 | 1078 | 1055 |
| 4 | 1046 | 1095 | 1015 | 1071 | 1098 | 1045 |
| 5 | 1082 | 1058 | 1019 | 1030 | 1073 | 1049 |
| 6 | 1062 | 1097 | 1059 | 1027 | 1004 | 1082 |

| B\A | 1 | 2 | 3 | 4 | 5 | 6 |
|---|---|---|---|---|---|---|
| 1 | 1077 | 1054 | 1075 | 1074 | 1018 | 1028 |
| 2 | 1011 | 978 | 983 | 974 | 1039 | 1050 |
| 3 | 1038 | 981 | 963 | 921 | 1061 | 1073 |
| 4 | 1026 | 1050 | 943 | 1031 | 1118 | 1054 |
| 5 | 1102 | 1070 | 1008 | 1022 | 1079 | 1034 |
| 6 | 1082 | 1116 | 1074 | 1025 | 1022 | 1065 |

Fig.3

| B\A | 1 | 2 | 3 | 4 | 5 | 6 |
|---|---|---|---|---|---|---|
| 1 | -10 | -18 | 11 | -20 | -1 | 10 |
| 2 | -11 | 33 | 66 | 50 | 12 | -14 |
| 3 | 9 | 62 | 99 | 81 | 17 | -18 |
| 4 | 20 | 45 | 72 | 40 | -20 | -9 |
| 5 | -20 | -12 | 11 | 8 | -6 | 15 |
| 6 | -20 | -19 | -15 | 2 | -18 | 17 |

Fig.4

| determining a first touching region where a variation value of capacitance is larger than or equal to a first preset value during each period of N consecutive periods, , in which N≥2 | — S1 |

↓

| outputting a touching signal according to the first touching region | — S2 |

| B\A | 1 | 2 | 3 | 4 | 5 | 6 |
|---|---|---|---|---|---|---|
| 1 | 15 | -10 | -15 | 14 | 13 | -12 |
| 2 | 20 | 30 | 66 | 50 | -12 | -9 |
| 3 | 0 | 62 | 99 | 81 | -10 | -19 |
| 4 | -13 | 45 | 72 | 40 | 2 | -8 |
| 5 | -16 | 1 | -12 | 3 | 78 | 19 |
| 6 | 18 | -9 | -10 | -2 | -3 | 12 |

Fig.7

| B\A | 1 | 2 | 3 | 4 | 5 | 6 |
|---|---|---|---|---|---|---|
| 1 | 20 | -6 | 0 | -9 | 1 | 0 |
| 2 | -17 | 36 | 61 | 52 | 1 | -13 |
| 3 | -18 | 60 | 108 | 78 | 33 | 16 |
| 4 | -6 | 44 | 77 | 45 | 14 | -11 |
| 5 | 5 | -5 | -20 | 11 | 8 | -19 |
| 6 | -14 | 2 | -17 | 10 | -15 | -13 |

METHOD AND APPARATUS FOR DETERMINING TOUCHING ACTION AND DISPLAY DEVICE

TECHNICAL FIELD

The present disclosure relates to a touch field, and particularly, to method and apparatus for determining touching action and a display device.

BACKGROUND

A capacitance sensor is generally positioned below a protective cover, in which an electrode A and an electrode B form a two-dimensional matrix intersecting with each other by designing a certain pattern. In the matrix, each touching region (as shown in FIG. 1) corresponds to one characteristic capacitance. A certain gap should be designed between the two electrodes so as to avoid short-circuit, and some suspended blocks are inserted between the electrode A and the electrode B to improve visual effect.

When one finger touches a touching device, the finger may generate capacitance C1&C2 with the electrodes A and B, respectively. Such a capacitance may vary the characteristic capacitance Cm between the electrodes A and B (as shown in FIG. 2, a value of the capacitance CM in each of the area in a 6*6 touching area) to be Cm' (as shown in FIG. 3). The variation quantity of the characteristic capacitance before and after touching is represented by $\Delta C=Cm-Cm'$ (as shown in FIG. 4). The variation value of capacitance caused by touching of the finger $\Delta C$ is about 100 (such a value is a dimensionless number converted by analog-digital conversation, without specifically illustrated, the capacitance in the present disclosure shares the same unit as such a value).

However, the touching device meets a complex noise scene in realism, which comprises power supply noise, LCD noise, system noise, external environment noise and so on. Superposing of these noises may lead to that there is a possibility of variation quantity of the characteristic capacitance between the two electrodes exceeding a trigger threshold. In the prior art, during a scanning cycle, a determination about whether it is a touching event is made by cooperating with a corresponding algorithm for filtering noise. However, the algorithm for filtering noise is generally complex and has an unfavorable effect of filtering noise.

SUMMARY

The technical problem to be solved by the present disclosure is to enhance accuracy for determining the touching event so as to avoid false trigger of the touching event of a touch panel by external noises.

As for such an object, the present disclosure provides a method for determining touching action applied to a touch panel, the touch panel comprises a plurality of touching regions. The method comprises the following steps of: determining a first touching region where a variation value of capacitance is larger than or equal to a first preset value during each period of N consecutive periods, in which N≥2; and outputting a touching signal according to the first touching region, wherein each period of the N consecutive periods is a scanning period of the touch panel.

Preferably, a total length of the N consecutive periods is from 5 ms to 10 ms.

Preferably, the total length of the N consecutive periods is 10 ms.

Preferably, 3≤N≤5.

Preferably, the method may further comprise: determining a second touching region where a variation value of capacitance is larger than or equal to a second preset value during n periods of the N consecutive periods, in which n<N; and recording a position of the second touching region.

The present disclosure also provides an apparatus for determining touching action applied to a touch panel. The touch panel comprises a plurality of touching regions. The apparatus comprises: a determining unit configured for determining a first touching region where a variation value of capacitance is larger than or equal to a first preset value during each period of N consecutive periods, in which N≥2; and an outputting unit configured for outputting a touching signal according to the first touching region, wherein each period of the N consecutive periods is a scanning period of the touch panel.

Preferably, a total length of the N consecutive periods is from 5 ms to 10 ms.

Preferably, the total length of the N consecutive periods is 10 ms.

Preferably, 3≤N≤5.

Preferably, the determining unit is further configured for determining a second touching region where a variation value of capacitance is larger than or equal to a second preset value during n periods of the N consecutive periods, in which n<N; and the apparatus for determining touching action further comprises a recording unit configured for recording a position of the second touching region.

The present disclosure further provides a display device comprising the apparatus for determining touching action as mentioned above.

By utilizing the embodiments as mentioned above, it may scan all of the touching regions of the touch panel during N consecutive scanning periods, and then determine the first touching region where a variation value of capacitance larger than or equal to the first preset value during the N consecutive scanning periods to be a region touched by the user so as to output a touch signal based on the region. Since it can't determine a touching region where a variation value of capacitance larger than or equal to a preset value only during a few scanning periods to be the region touched by the user, the accuracy for determining the touching event may be enhanced so as to avoid false trigger of the touching event of a touch panel by external noises.

BRIEF DESCRIPTION OF THE DRAWINGS

The characteristics and advantages of the present invention will be apparent by referring to accompany figures, which is schematic and should not be understood to be limit the present invention in any aspects, in which:

FIG. 1-5 show a schematic view of capacitance variation of the touching regions;

FIG. 6 shows a schematic flowchart of the method for determining touching action according to one embodiment of the present disclosure;

FIG. 7 shows variation value of capacitance of each touching region of the touch panel after the first frame is scanned according to one embodiment of the present disclosure;

FIG. 8 shows variation value of capacitance of each touching region of the touch panel after the second frame is scanned according to one embodiment of the present disclosure;

DETAILED DESCRIPTION

In order to further understand the objectives, characteristics and advantages of the present invention as mentioned above, the present invention will be further illustrated in detail in conjunction with the accompany figures and particular embodiments in the following. It should be noted that one embodiment may be combined with other embodiments without conflicting.

In the following description, many particular details are illustrated to completely understand the present invention. However, the present invention may be implemented by embodiments other than the embodiments explained herein. The scope of the present invention is not limited by the following particular embodiment.

Figures 1, 2:
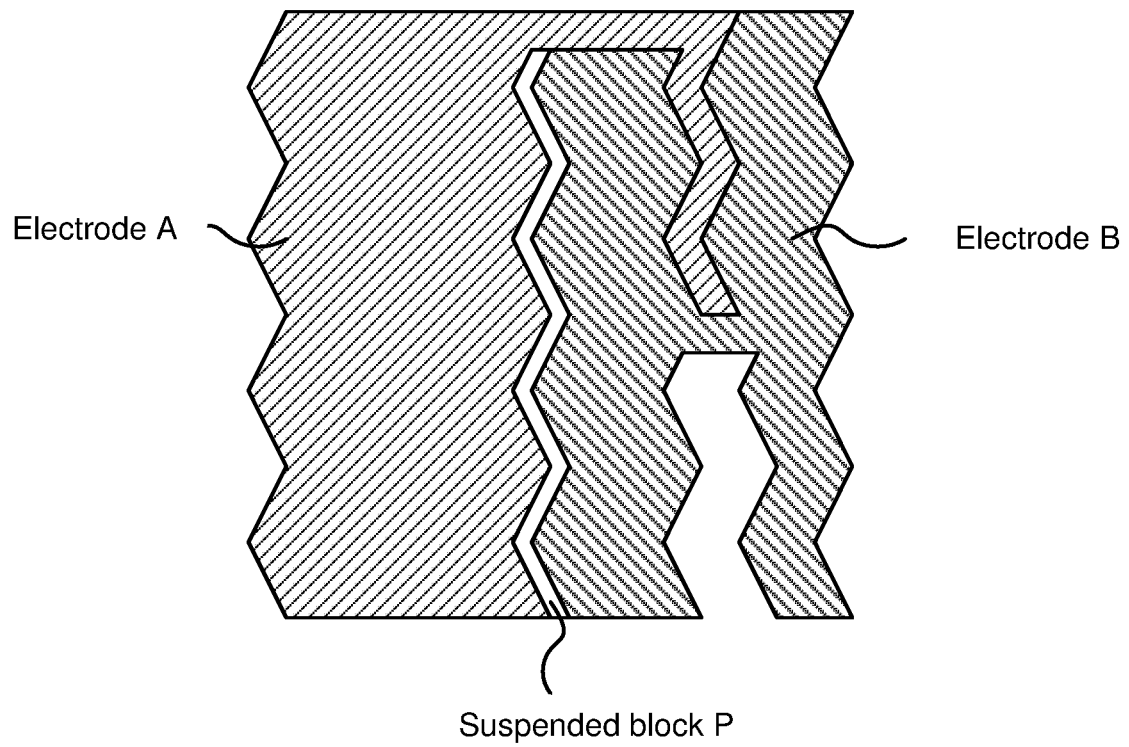

As shows in FIG. 2, a characteristic capacitance Cm of the respective touching region of the touch apparatus is stored in the first register as Basedata in advance.

As shown in FIG. 3, the touch apparatus collects the characteristic capacitance Cm' of the respective touching region in real time, and stores them in the second register as Rawdata.

As shown in FIG. 4, Diffdata (ΔC)=Basedata-Rawdata is calculated and a calculation result of a two dimensional matrix of Diffdata is stored in the third register.

Figures 5, 6:
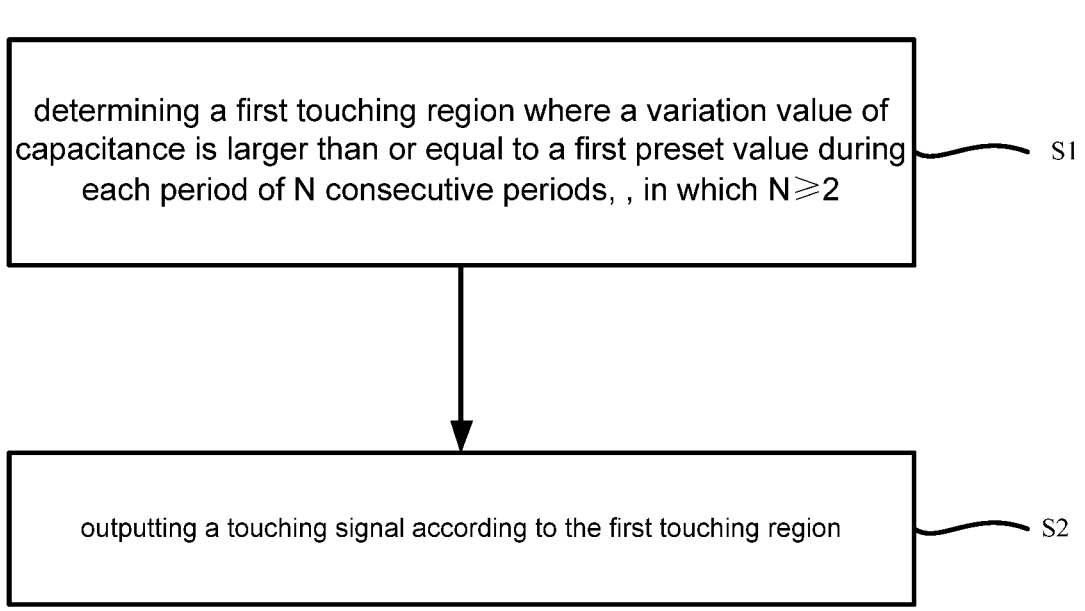

As shown in FIG. 5, during one scanning cycle, under the common influence of multiple noises, the variation quantity of the capacitance in some part of the touching regions (2, 3) and (5, 5) exceeds the touching threshold, which will lead to an issue of automatic triggering of the touching event. The presence of noise affects a normal touching function of the touch apparatus (such as failure of touching, inaccuracy of touching, automatic touching and so on) and degrades user's experience.

As shown in FIG. 6, there is provided a method for determining touching action applied to a touch panel that comprises a plurality of touching regions according to one embodiment of the present disclosure. The method comprises the following steps.

At a step of S1, determining a first touching region where a variation value of capacitance is larger than or equal to a first preset value during each period of N consecutive periods, in which N≥2.

At a step of S2, outputting a touching signal according to the first touching region, wherein each period of the N consecutive periods is a scanning period of the touch panel.

Since the touching operation by the user generally will continue for a certain period, a touching event caused by touching operations of the user leads to that a variation value of capacitance of the first touching region in each period of N consecutive periods is larger than or equal to a first preset value. On the contrary, since the noise continues for a shorter period, it only leads to that a variation value of capacitance of the first touching region in some one period of N consecutive periods is larger than or equal to a first preset value.

According to the embodiment of the present disclosure, all of the touching regions of the touch panel may be scanned during N consecutive scanning periods, and a the first touching region having a variation value of capacitance larger than or equal to a preset value during the N consecutive periods is determined to be the region touched by the user and a touch signal is output based on it. In addition, the touching region having a variation value of capacitance larger than or equal to a preset value only during some a few scanning periods can't be determined to be the region touched by the user. Consequently, the accuracy for determining the touching event may be enhanced so as to avoid false trigger of the touching event of a touch panel by external noises. In order to simplify the description, in the following the scanning period of the touch panel is called as one frame. In the present embodiment, since each of the periods is equal to one frame (e.g. a length of one frame is 2 ms), it may ensure that all of the touching regions of the touch panel may be completely scanned once during each of the periods, and the touching region of the touch panel can't be missed so as to ensure the accuracy of the first touching region of the display panel having a variation value of capacitance larger than or equal to a preset value during each period of the N consecutive periods.

In one preferable embodiment, a total length of the N consecutive periods is from 5 ms to 10 ms.

Since the shortest duration length of the touching operation by the user (such as clicking, sliding) is generally 10 ms, the total length of the N consecutive periods is set to be less than 10 ms (e.g. N=4, a length of one period is 2 ms, so the total length of the N consecutive periods is 8 ms), so as to ensure that the touching operation of the user may maintain the variation value of capacitance of the first touching region to be larger than or equal to a preset value during each of the N consecutive periods and to precisely determine the touching event.

The value of the noise is random in each of the scanning periods and the influence of the noise on the same node in different scanning periods is different from each other. If the touching operation of the user causes change of capacitance at this node, the capacitance will be basically constant during the N consecutive scanning periods, so as to conveniently distinguish the first touching region having variation value of capacitance larger than or equal to a preset value and caused by the user's touching from the region having variation value of capacitance larger than or equal to a preset value and caused by noise so that the accuracy for identifying the touching operation can be ensured.

In one preferable embodiment, the total length of the N consecutive periods is 10 ms.

According to the present embodiment, the total length of the N consecutive periods may be set as a constant value so as to omit a process of selecting an appropriate total length during the process of determining the first region.

In one preferable embodiment, 3≤N≤5. That is to say, all of the touching regions of the touch panel are scanned for three to five times during the N periods. In the following, it takes N=3 as an example to illustrate.

The variation value of capacitance of each touching region of the touch panel after the first frame is scanned is shown in FIG. 7, in which the variation values of capacitance at a touching region with a coordinate of (3,3) and its surrounding five touching regions are larger than 50, and the variation value of capacitance at a touching region with a coordinate of (5,5) is larger than 50.

The variation value of capacitance of each touching region of the touch panel after the second frame is scanned is shown in FIG. 8, in which the variation values of capacitance at a touching region with a coordinate of (3,3) and its surrounding five touching regions are larger than 50.

Figures 9, 10:
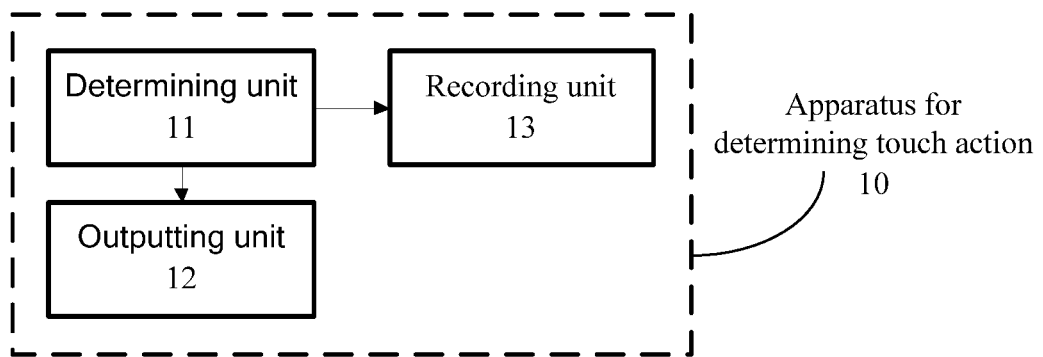
FIG. 9 shows variation value of capacitance of each touching region of the touch panel after the third frame is scanned according to one embodiment of the present disclosure.
FIG. 10 shows a schematic block diagram of the apparatus for determining touching action according to one embodiment of the present disclosure.

The variation value of capacitance of each touching region of the touch panel after the third frame is scanned is shown in FIG. 9, in which the variation values of capacitance at a touching region with a coordinate of (3,3) and its surrounding five touching regions are larger than 50, and the variation value of capacitance at a touching region with a coordinate of (1,1) is larger than 50.

Thus, it may be determined that the first touching region is the touching region with a coordinate of (3, 3) and its surrounding five touching regions. Furthermore, the five touching regions as mentioned above can be calculated on the basis of algorithm of center of gravity to determine a coordinate of the touching event and to upload the coordinate.

According to the present embodiment, on one hand, the touch panel may be scanned for multiple times during the N periods to ensure excellently identify a touching operation of the user; on the other hand, it may avoid scanning the touch panel for too much times during the N periods so as to decrease requirement of the scanning circuit.

In one preferable embodiment, the method may further comprise: determining a second touching region where a variation value of capacitance is larger than or equal to a second preset value during n periods of the N consecutive periods, in which n<N; and recording a position of the second touching region.

According to the embodiment as mentioned above, it may determine the first touching region having a variation value of capacitance larger than or equal to the first preset value during each of the N consecutive scanning periods to be a region touched by the user. Then, it may determine a touching region having a variation value of capacitance larger than or equal to a second preset value during n periods of the N consecutive periods to be a region having a large variation value of capacitance caused by noise. By recording a position of the second touching region, it facilitates to count and maintain the position at which noise appears.

As shown in FIG. 10, an apparatus 10 for determining touching action according to one embodiment of the present disclosure is applied to a touch panel. The apparatus comprises: a determining unit 11 configured for determining a first touching region where a variation value of capacitance is larger than or equal to a first preset value during each period of N consecutive periods, in which N≥2; and an outputting unit 12 configured for outputting a touching signal according to the first touching region, wherein each period of the N consecutive periods is a scanning period of the touch panel.

In one preferable embodiment, a total length of the N consecutive periods is from 5 ms to 10 ms.

In one preferable embodiment, the total length of the N consecutive periods is 10 ms.

In one preferable embodiment, 3≤N≤5.

In one preferable embodiment, the determining unit 11 is further configured for determining a second touching region where a variation value of capacitance is larger than or equal to a second preset value during n periods of the N consecutive periods, in which n<N; and the apparatus 10 for determining touching action further comprises a recording unit 13 configured for recording a position of the second touching region.

The present disclosure further provides a display device comprising the apparatus for determining touching action as mentioned above.

It should be noted that the display device according to embodiments of the present disclosure may be any products or components having a display function, such as an electronic paper, mobile phone, tablet computer, television, notebook, digital photo frame, navigator and the like.

The technical solution of the present invention is illustrated in detail by referring the accompany figures in consideration that it is difficult for the prior art to effectively eliminate influence of noise during the process of determining the touching event. By utilizing the embodiments as mentioned above, it may scan all of the touching regions of the touch panel during N consecutive scanning periods, and then determine the first touching region has a variation value of capacitance larger than or equal to the first preset value during the N consecutive scanning periods to be a region touched by the user so as to output a touch signal based on the region. Since it can't determine a touching region has a variation value of capacitance larger than or equal to a preset value only during a few scanning periods, the accuracy for determining the touching event may be enhanced so as to avoid false trigger of the touching event of a touch panel by external noises.

In the present disclosure, terms of "first", "second" and "third" are only utilized for description and can't be understood to indicate or imply relative importance. The term "multiple" represents two or more except for definite definition.

The above descriptions only show preferable embodiments of the present disclosure and are not used to limit the present invention. There are various modification and variation in the present invention for those skilled in the art. All of the changes, equivalences and modifications with the scope of spirit and principle of the present invention fall in the scope of the present invention.

We claim:

1. A method for determining touching action applied to a touch panel, the touch panel comprising a plurality of touching regions, wherein the method comprises the following steps of:

detecting variation values of capacitance in each touching region of the plurality of touching regions;

determining a first touching region, wherein all of variation values of capacitance in the first touching region are larger than or equal to a preset value during each period of N consecutive periods, in which 5≥N≥3; and outputting a touching signal according to the first touching region, wherein each period of the N consecutive periods is a frame scanning period of the touch panel and the frame scanning period equals 2 ms;

wherein the method further comprises determining, as a region in which noise appears, a second touching region, wherein only n variation values of capacitance in the second touching region are larger than or equal to the preset value during n periods of the N consecutive periods n<N; and recording a position of the second touching region so as to count and maintain the region in which the noise appears;

wherein the variation values of capacitance in the touching region are equal to a difference of a value of capacitance detected in the touching region with a preset capacitance for the touching region; and wherein detecting variation values of capacitance in each touching region of the plurality of touching regions further comprises detecting a characteristic capacitance between two electrodes intersecting with each other.

2. The method for determining touching action according to claim 1, wherein a total length of the N consecutive periods is from 5 ms to 10 ms.

3. The method for determining touching action according to claim 2, wherein the total length of the N consecutive periods is 10 ms.

4. An apparatus for determining touching action applied to a touch panel, the touch panel comprising a plurality of touching regions, wherein the apparatus is configured to:
  detect variation values of capacitance in each touching region of the plurality of touching regions
  determine a first touching region, wherein all of variation values of capacitance in the first touching regions are larger than or equal to a preset value during each period of N consecutive periods, in which 5≥N≥3; and
  output a touching signal according to the first touching region,
  wherein each period of the N consecutive periods is a frame scanning period of the touch panel and the frame scanning period equals 2 ms;
  wherein the apparatus is further configured to determine, as a region in which noise appears, a second touching region, wherein only n variation values of capacitance in the second touching regions are larger than or equal to the preset value during n periods of the N consecutive periods, n<N; and record a position of the second touching region so as to count and maintain the region in which the noise appears;
  wherein the variation values of capacitance in the touching region are equal to a difference of a value of capacitance detected in the touching region with a preset capacitance for the touching region; and
  wherein the apparatus is further configured to detect a characteristic capacitance between two electrodes intersecting with each other.

5. The apparatus for determining touching action according to claim 4, wherein a total length of the N consecutive periods is from 5 ms to 10 ms.

6. The apparatus for determining touching action according to claim 5, wherein the total length of the N consecutive periods is 10 ms.

7. A display device comprising the apparatus according to claim 4.

* * * * *